(12) United States Patent
Miescher et al.

(10) Patent No.: US 11,110,574 B2
(45) Date of Patent: Sep. 7, 2021

(54) DRIVING DEVICE AND FASTENING ELEMENT STRIP

(71) Applicant: HILTI AKTIENGESELLSCHAFT, Schaan (LI)

(72) Inventors: Stefan Miescher, Schaan (LI); Mikko Merikoski, Tampere (FI)

(73) Assignee: HILTI AKTIENGESELLSCHAFT, Schaan (LI)

( * ) Notice: Subject to any disclaimer, the term of this patent is extended or adjusted under 35 U.S.C. 154(b) by 166 days.

(21) Appl. No.: 16/469,697

(22) PCT Filed: Dec. 5, 2017

(86) PCT No.: PCT/EP2017/081514
§ 371 (c)(1),
(2) Date: Jun. 14, 2019

(87) PCT Pub. No.: WO2018/108630
PCT Pub. Date: Jun. 21, 2018

(65) Prior Publication Data
US 2020/0078914 A1    Mar. 12, 2020

(30) Foreign Application Priority Data
Dec. 15, 2016   (EP) ..................................... 16204199

(51) Int. Cl.
*F16B 15/08*       (2006.01)
*B25C 1/00*        (2006.01)

(52) U.S. Cl.
CPC .............. *B25C 1/005* (2013.01); *F16B 15/08* (2013.01)

(58) Field of Classification Search
CPC .................. B25C 1/005; F16B 15/08
See application file for complete search history.

(56) References Cited

U.S. PATENT DOCUMENTS 2,909,780 A    10/1959  Wandel
4,011,758 A     3/1977  Reenstra et al.
(Continued)

FOREIGN PATENT DOCUMENTS

CN    100408449 C    8/2008
CN    103085030 B    9/2015
(Continued)

OTHER PUBLICATIONS

International Bureau, International Search Report in International Application No. PCT/EP2017/081514, dated Feb. 9, 2018.

*Primary Examiner* — Nathaniel C Chukwurah
(74) *Attorney, Agent, or Firm* — Leydig, Voit & Mayer, Ltd.

(57) ABSTRACT

A device for driving fastening elements into a substrate comprises a setting channel; an energy transmission element, which can be moved in a fastening direction in the setting channel, for transmitting energy to one of the fastening elements at a time; and a magazine for transporting the fastening elements to the setting channel in a transport direction. The magazine is suitable for transporting multiple rows of fastening elements at once. Additionally, a fastening element strip comprises a plurality of rows of receptacles for fastening elements aligned in a transport direction and fastening elements which are housed in the receptacles and define a fastening direction, wherein the rows of receptacles are arranged one behind the other in a transverse direction oriented perpendicular to the transport direction and perpendicular to the fastening direction.

6 Claims, 12 Drawing Sheets

(56) References Cited

U.S. PATENT DOCUMENTS

Figure 1:
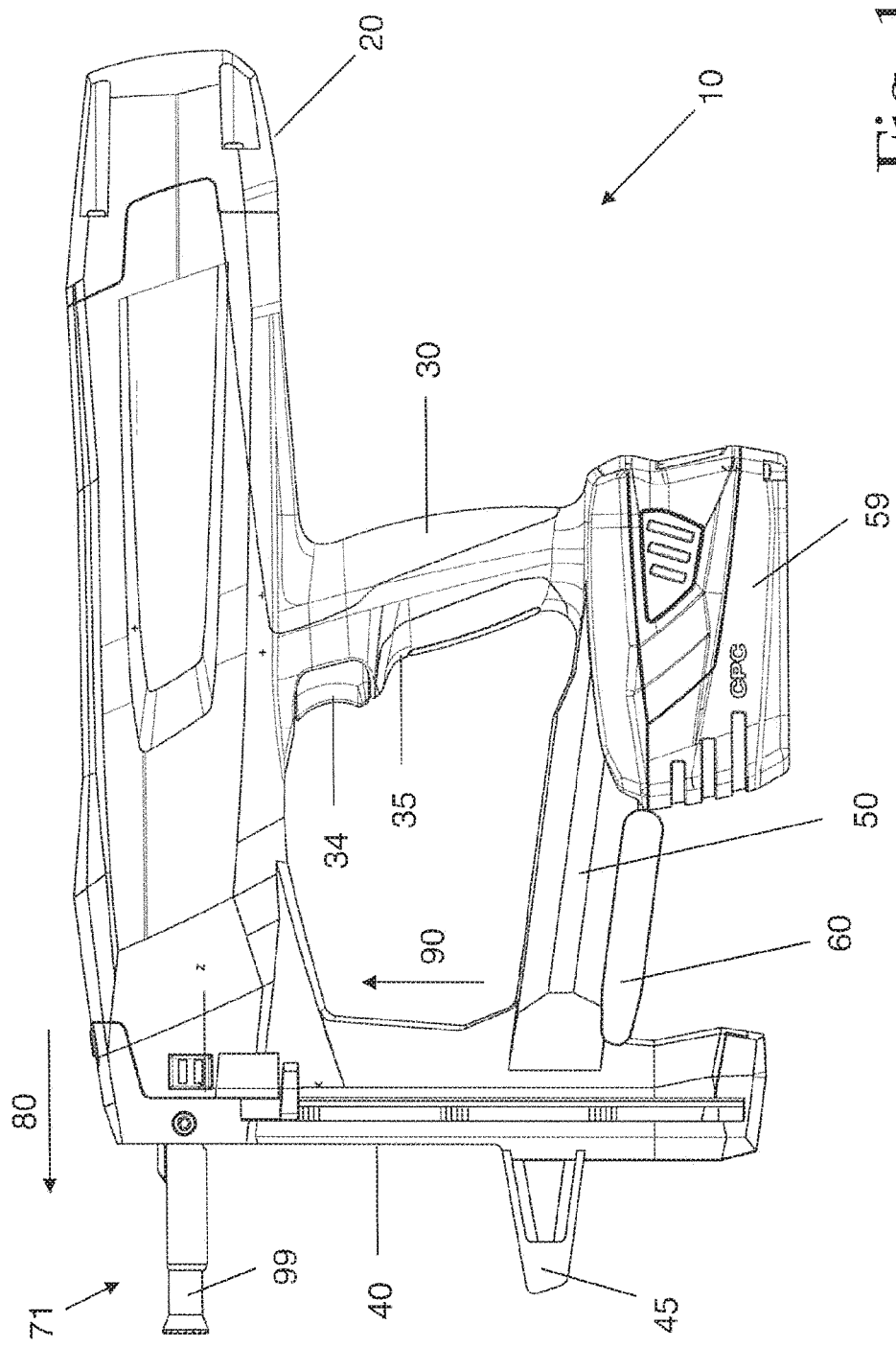

| | | | |
|---|---|---|---|
| 4,011,785 A | 3/1977 | Schrepferman | |
| 4,106,618 A | 8/1978 | Haytayan | |
| 4,221,153 A | 9/1980 | Medina | |
| 4,367,973 A | 1/1983 | Gilb et al. | |
| 4,881,643 A * | 11/1989 | Pfister | F16B 15/08 206/343 |
| 4,932,821 A | 6/1990 | Steffen et al. | |
| 5,927,585 A | 7/1999 | Moorman et al. | |
| 5,975,399 A * | 11/1999 | Oehri | B25C 1/184 227/120 |
| 6,237,747 B1 * | 5/2001 | Gantner | B25C 1/184 198/747 |
| 6,604,665 B2 | 8/2003 | Gabriel | |
| 7,963,393 B2 * | 6/2011 | Nakagawa | F16B 15/08 206/343 |
| 2002/0060234 A1 * | 5/2002 | Osuga | B25C 1/005 227/120 |
| 2003/0057250 A1 | 3/2003 | Gabriel | |
| 2003/0136693 A1 | 7/2003 | Gupta | |
| 2004/0118719 A1 | 6/2004 | Powers et al. | |
| 2004/0118720 A1 * | 6/2004 | Powers | F16B 43/00 206/346 |
| 2008/0093410 A1 | 4/2008 | Canlas et al. | |
| 2008/0121678 A1 * | 5/2008 | Spasov | B25C 1/06 227/132 |
| 2010/0243703 A1 * | 9/2010 | Miescher | F16B 27/00 227/140 |

FOREIGN PATENT DOCUMENTS

| | | |
|---|---|---|
| DE | 3308630 A1 | 9/1984 |
| EP | 1298332 A2 | 4/2003 |
| JP | S5520999 A1 | 2/1980 |
| JP | S59209773 A1 | 11/1984 |
| JP | S63210404 A1 | 9/1988 |
| JP | 2003094354 A1 | 4/2003 |
| TW | 376355 B | 12/1999 |
| TW | 426984 B | 3/2001 |
| TW | 200831248 A | 8/2008 |

* cited by examiner

DRIVING DEVICE AND FASTENING ELEMENT STRIP

CROSS-REFERENCE TO RELATED APPLICATIONS

This patent application is the U.S. National Stage of International Patent Application No. PCT/EP2017/081514, filed Dec. 5, 2017, which claims the benefit of European Patent Application No. 16204199.0, filed Dec. 15, 2016, which are each incorporated by reference.

TECHNICAL FIELD

The application relates to an apparatus for driving fastening elements into a substrate, and to a fastening element strip.

BACKGROUND OF THE INVENTION

Driving apparatuses usually have a piston which can move in a setting channel to transmit energy to the fastening element. The required energy must be furnished in a very short time, which is why—for example, in the case of spring-loaded nail guns—a spring is first tensioned, and then abruptly releases the tension energy into the piston during the driving operation, accelerating it against the fastening element. Furthermore, such driving apparatuses usually have a magazine for transporting the fastening elements to the setting channel.

The fastening elements are usually provided in the form of strips. Such a strip comprises receptacles for the fastening elements, which are arranged in a row. The receptacles of a strip are connected to each other by means of connecting webs.

Since it takes some time to load the magazine of the driving apparatus with a fastening element strip, it is desirable to do so with the greatest possible number of fastening elements at one time.

BRIEF SUMMARY OF THE INVENTION

According to one aspect of the application, an apparatus for driving fastening elements into a substrate comprises a setting channel, an energy transmitting element which can move in the setting channel in a fastening direction to transmit energy to each of the fastening elements, and a magazine for transporting the fastening elements in a transport direction to the setting channel. At the same time, the magazine transports a plurality of rows of fastening elements, arranged one behind the other in a transverse direction oriented perpendicular to the transport direction and perpendicular to the fastening direction, so as to transport fastening elements from different rows of the plurality of rows of fastening elements alternately into the setting channel.

The energy transmitting element preferably has a contact end pointing in the fastening direction, for contacting a fastening element arranged in the setting channel. According to a first embodiment, the contact end comprises a flat contact surface oriented perpendicular to the fastening direction, wherein the energy transmitting element is preferably designed as a hammer piston or thrust piston for driving nails, bolts or the like. According to a second embodiment, the contact end comprises a screw drive, wherein the energy transmitting element is preferably designed as a rotationally driven screw bit for driving screws or the like.

An advantageous embodiment is characterized in that the apparatus has an insertion bevel which is angled with respect to the transport direction to guide the foremost fastening element, as seen in the transport direction, of the plurality of rows of fastening elements into the setting channel. Preferably, the insertion bevel is suitable for aligning the row of the foremost fastening element of the plurality of rows of fastening elements with the setting channel. The insertion bevel is preferably connected to the setting channel rigidly.

An advantageous embodiment is characterized in that the magazine has a feed element which applies a force to the plurality of rows of fastening elements in the transport direction. According to a first embodiment, the feed element has a plurality of contact surfaces which are offset relative to each other in the transport direction, so that each contacts one of the plurality of rows of fastening elements. According to a second embodiment, the feed element has only one contact surface to contact exactly one of the plurality of rows of fastening elements.

An advantageous embodiment is characterized in that the apparatus has a contact pressure element which is offset relative to the magazine when the apparatus is pressed against the substrate, and which has a force transmission surface for transmitting a force, toward the setting channel, to the foremost—in the transport direction—fastening element of the plurality of rows of fastening elements, in order to position the foremost fastening element in the setting channel. The contact pressure element preferably comprises a control surface for guiding the foremost fastening element of the plurality of rows of fastening elements into the setting channel in the transport direction.

An advantageous embodiment is characterized in that the magazine has a guide channel for guiding the plurality of rows of fastening elements, wherein an opening of the guide channel opens into the setting channel, and wherein the opening can move back and forth in the transverse direction between a first position and a second position. Preferably, the guide channel has a control surface counter surface for a controlled movement of the opening into the first or second position when the control surface of the contact pressure element acts on the control surface counter surface. Also preferably, the guide channel is pivotally mounted about a pivot axis which is offset relative to the setting channel. Particularly preferably, the pivot axis is oriented parallel to the fastening direction. Also particularly preferably, the pivot axis intersects the guide channel or an imaginary extension of the guide channel in or opposite to the transport direction.

According to one aspect of the application, a fastening element strip comprises several rows of receptacles for fastening elements, oriented in a transport direction, as well as fastening elements which are received in the receptacles and which define a fastening direction, wherein the rows of receptacles are arranged one behind the other in a transverse direction which is perpendicular to the transport direction and perpendicular to the fastening direction. In addition, the fastening element strip comprises a connecting web which connects one receptacle of a first row of the plurality of rows to a receptacle of a second row of the plurality of rows. Preferably, each receptacle of the first row is directly connected via a connecting web to an adjacent receptacle of a second row. Preferably, the connecting web is rigidly connected to the receptacle of the first row of the plurality of rows and/or to the receptacle of the second row of the plurality of rows. Also preferably, the connecting web, the receptacle of the first row of the plurality of rows, and/or the receptacle of the second row of the plurality of rows form an integral part, which preferably consists of a single material.

An advantageous embodiment is characterized in that each receptacle is offset in the transport direction relative to all other receptacles of the plurality of rows of receptacles. Preferably, the offset measured in the transport direction between two successive receptacles in the transport direction is the same for all receptacles.

An advantageous embodiment is characterized in that the connecting web has a predetermined breaking point for separating the first receptacle in a driving apparatus.

An advantageous embodiment is characterized in that the fastening element strip has a support projection with a contact surface for the fastening element strip to contact a guide channel of a magazine of a driving apparatus, wherein the support projection projects out of a receptacle of an outermost row of the plurality of rows and is offset in the transport direction relative to a fastening element accommodated in the receptacle. Due to the offset in the transport direction, the support projection supports the fastening element strip in the guide channel to prevent tilting about a tilting axis pointing in the fastening direction, thereby reducing the risk of the fastening element strip becoming jammed in the guide channel under certain conditions.

An advantageous embodiment is characterized in that the fastening element strip is suitable for being transported in a transport direction in a magazine of a driving apparatus according to the invention.

BRIEF DESCRIPTION OF THE SEVERAL VIEWS OF THE DRAWING(S)

Figure 2:
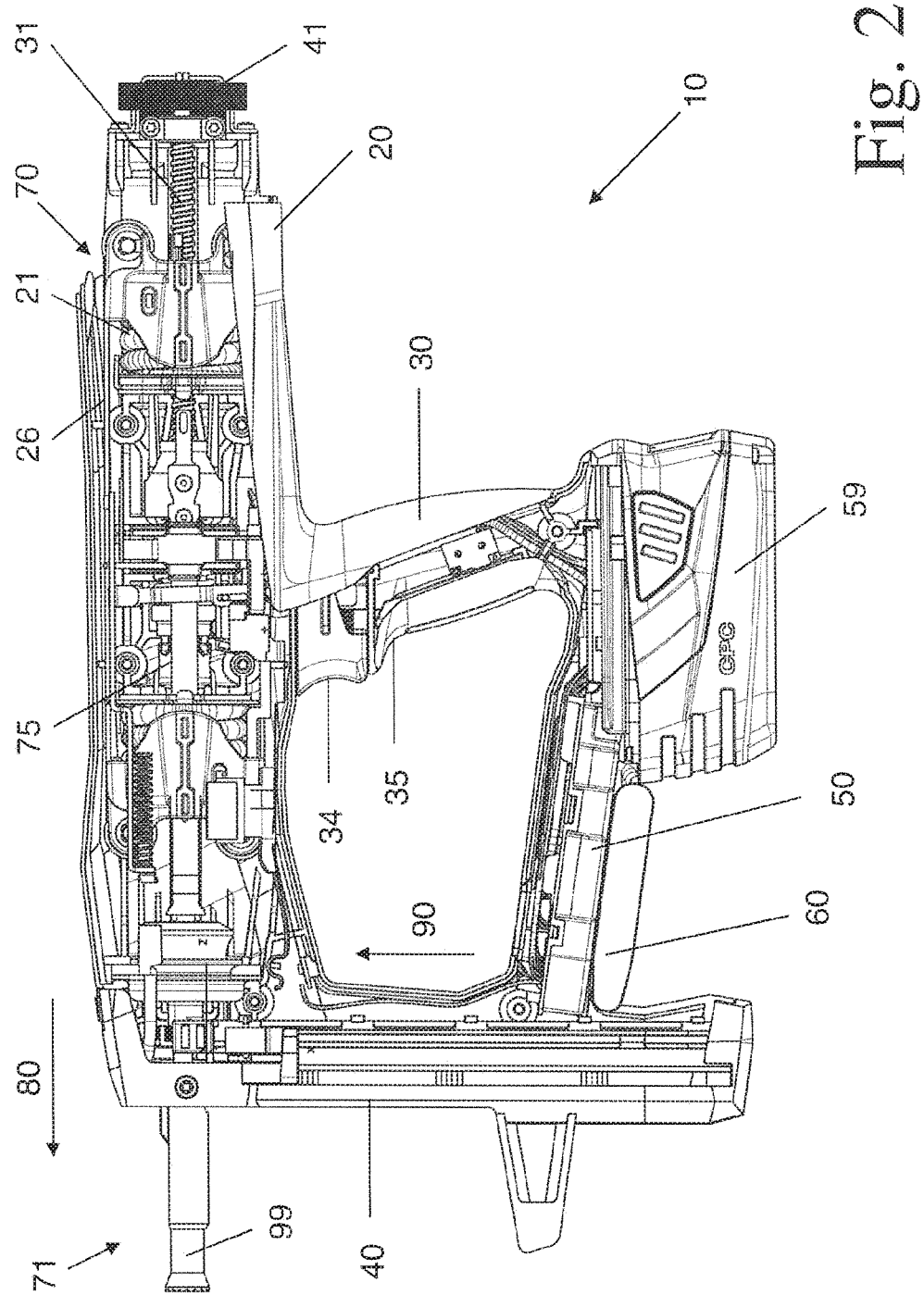
Figure 3:
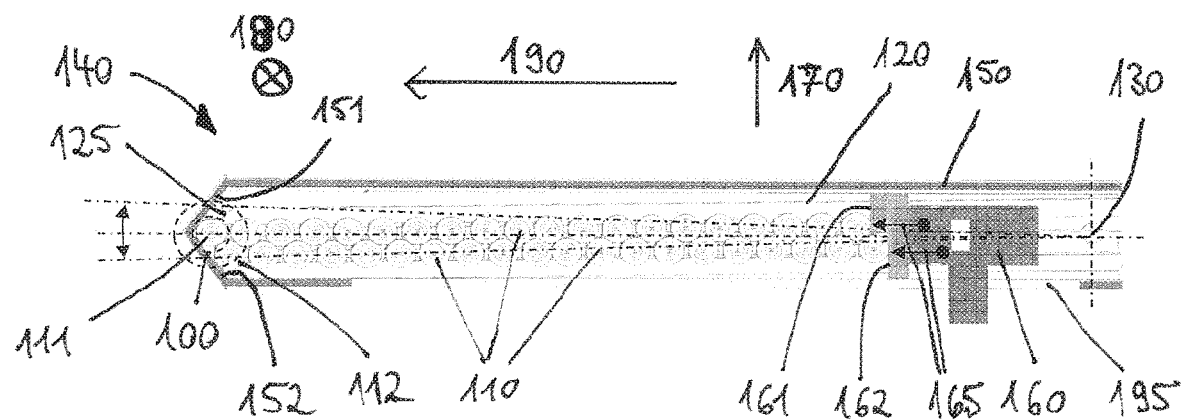
Figure 4:
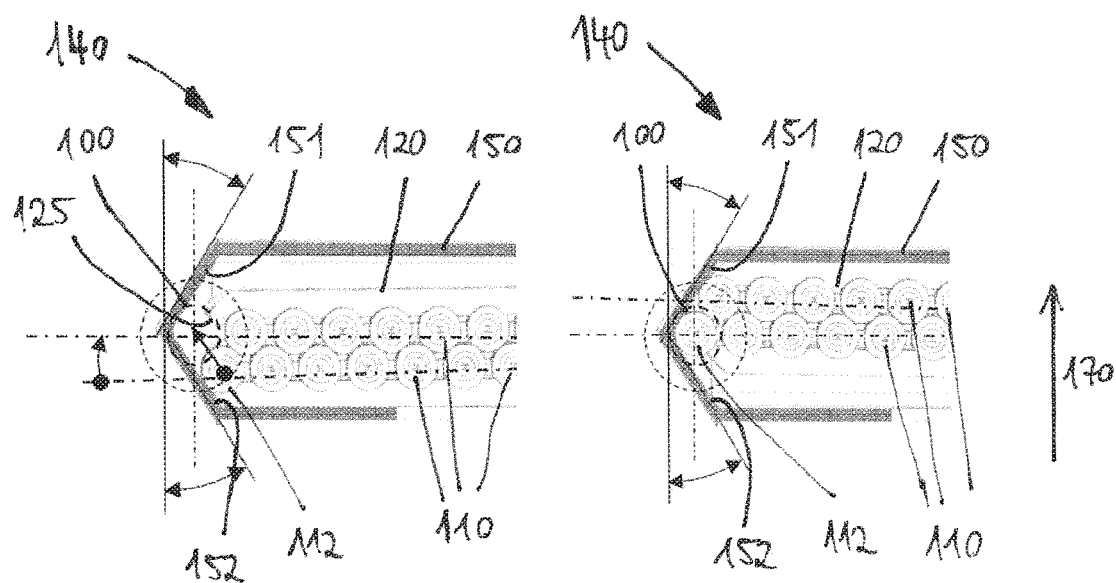
Figure 5:
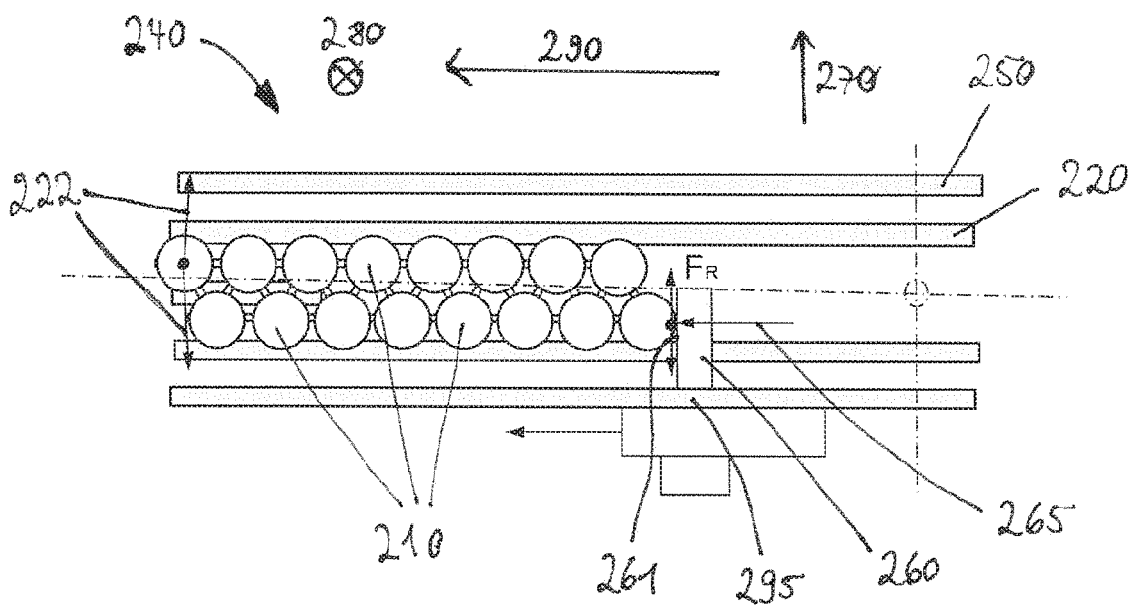
Figure 6:
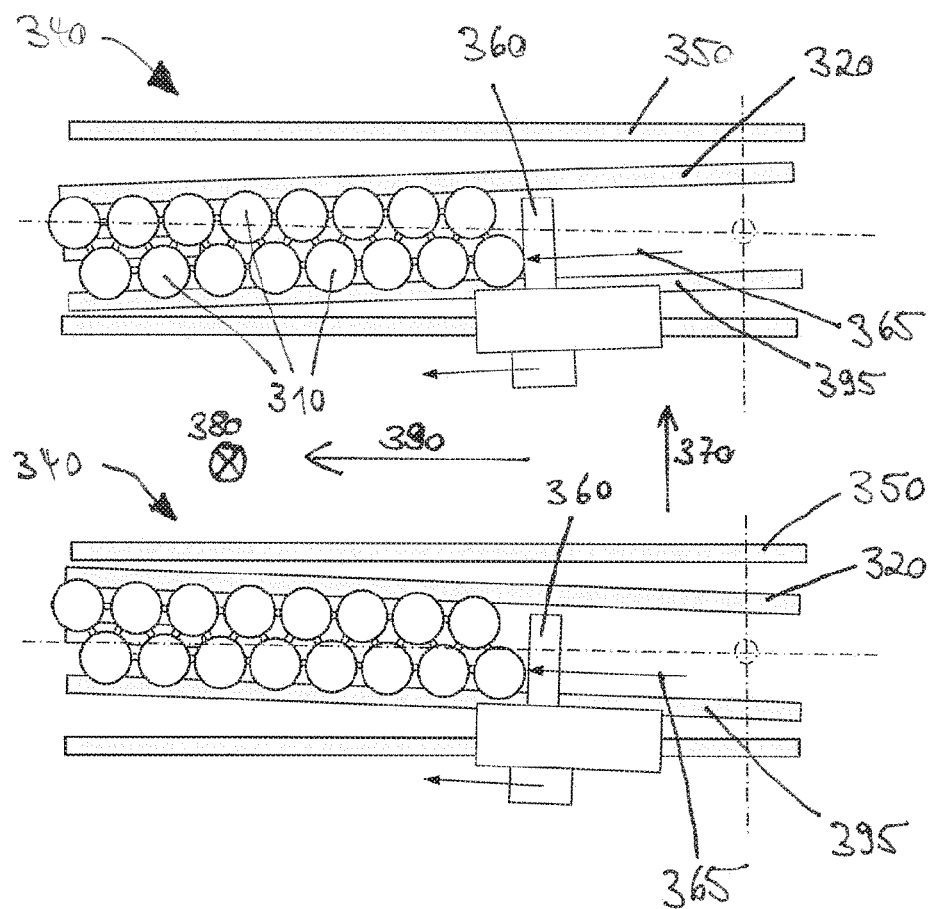
Figure 7:
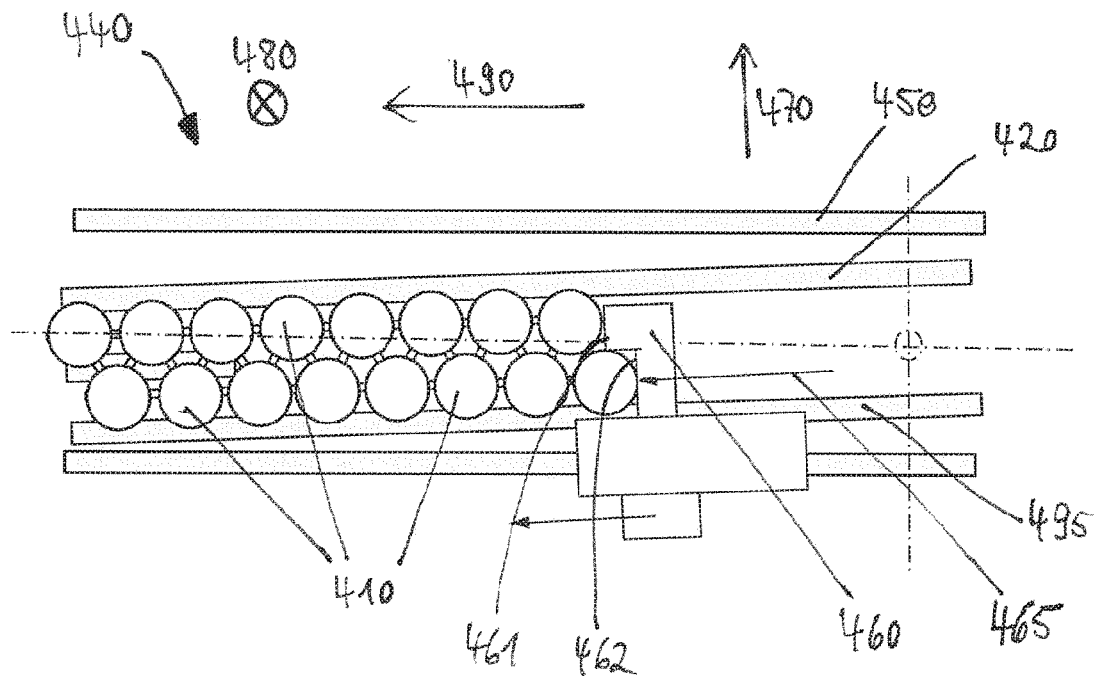
Figure 8:
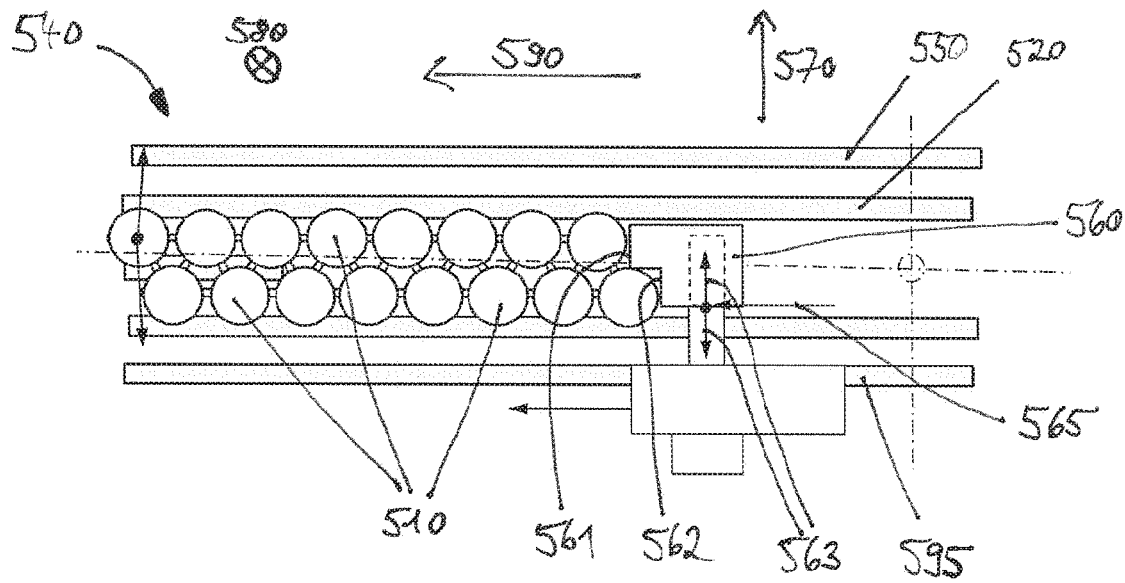
Figure 9:
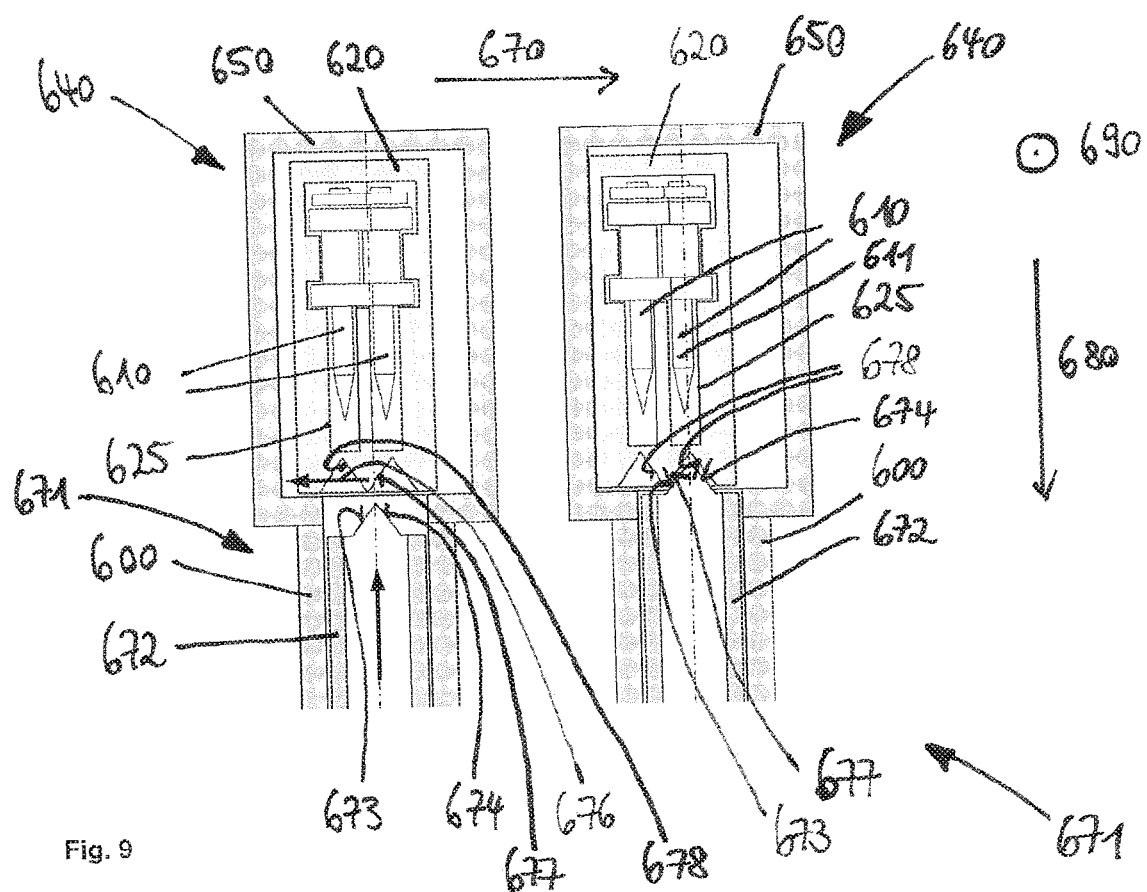
Figure 10:
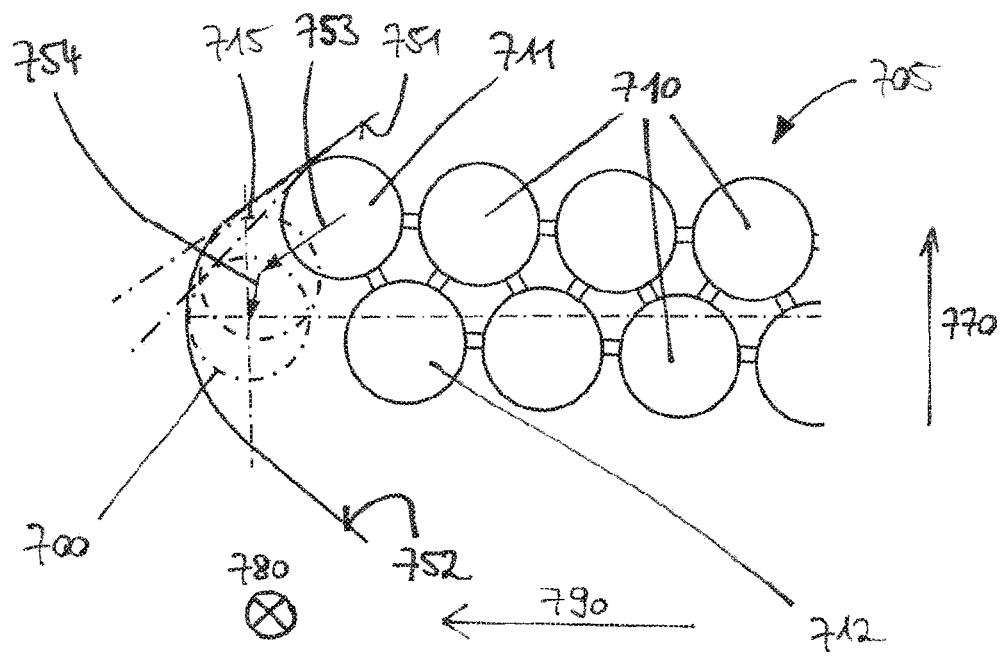
Figure 11:
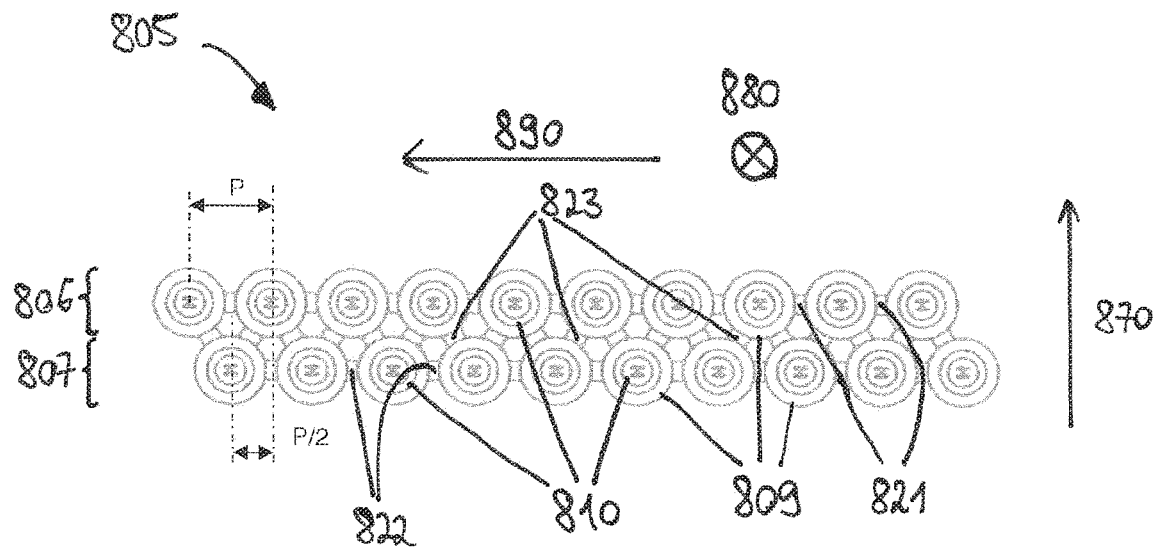
Figure 12:
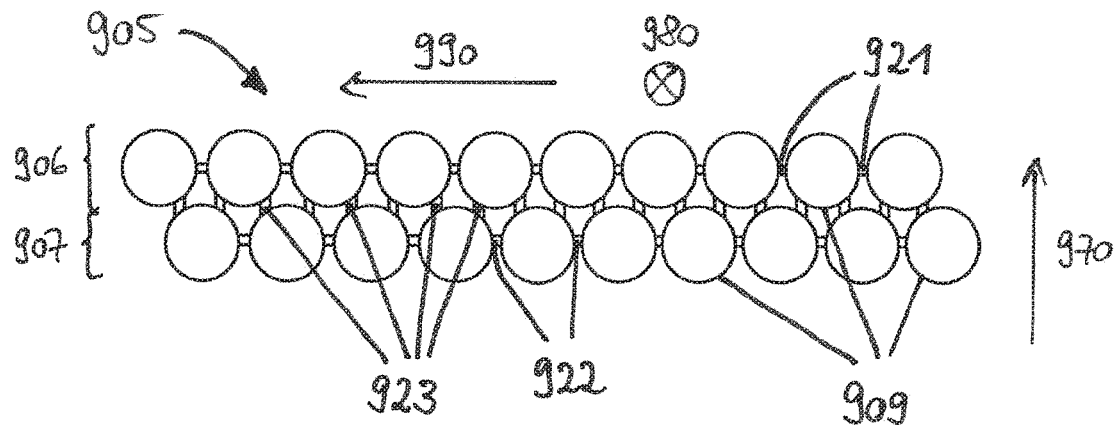
Figure 13:
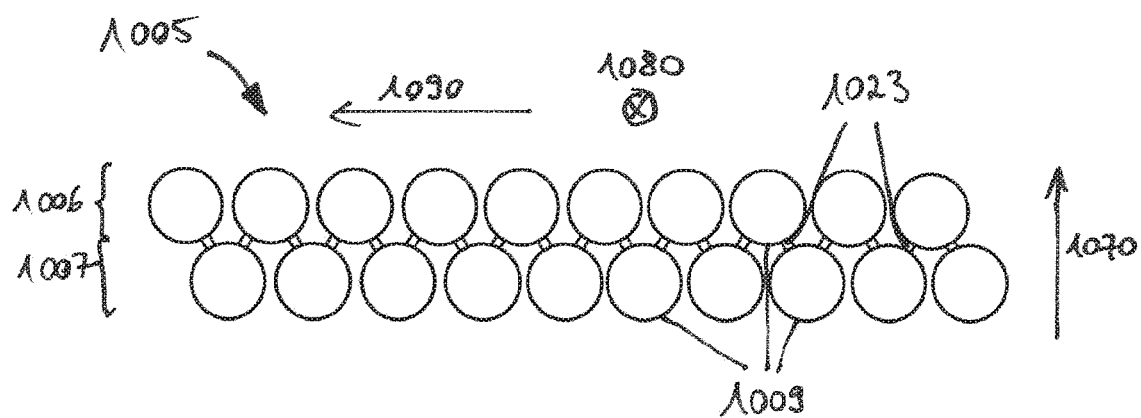
Figure 14:
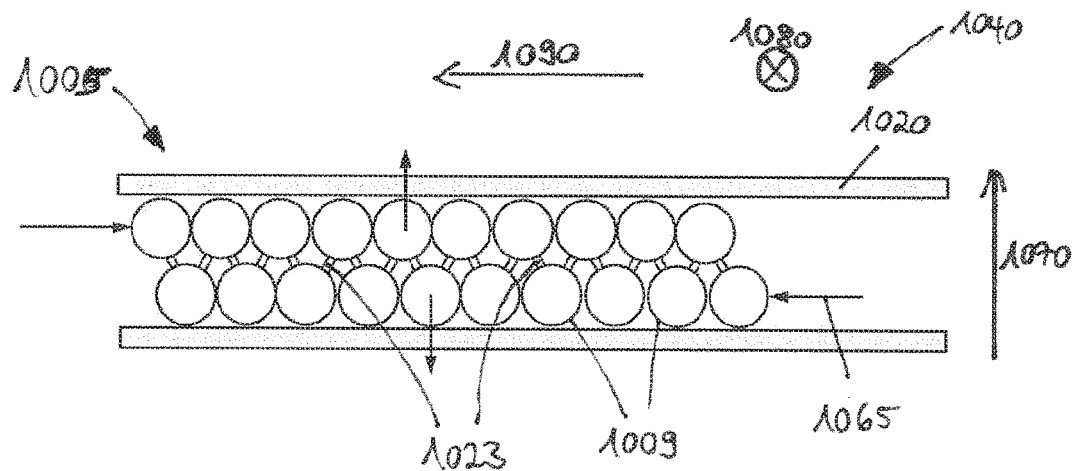
Figures 15, 16, 17, 18:
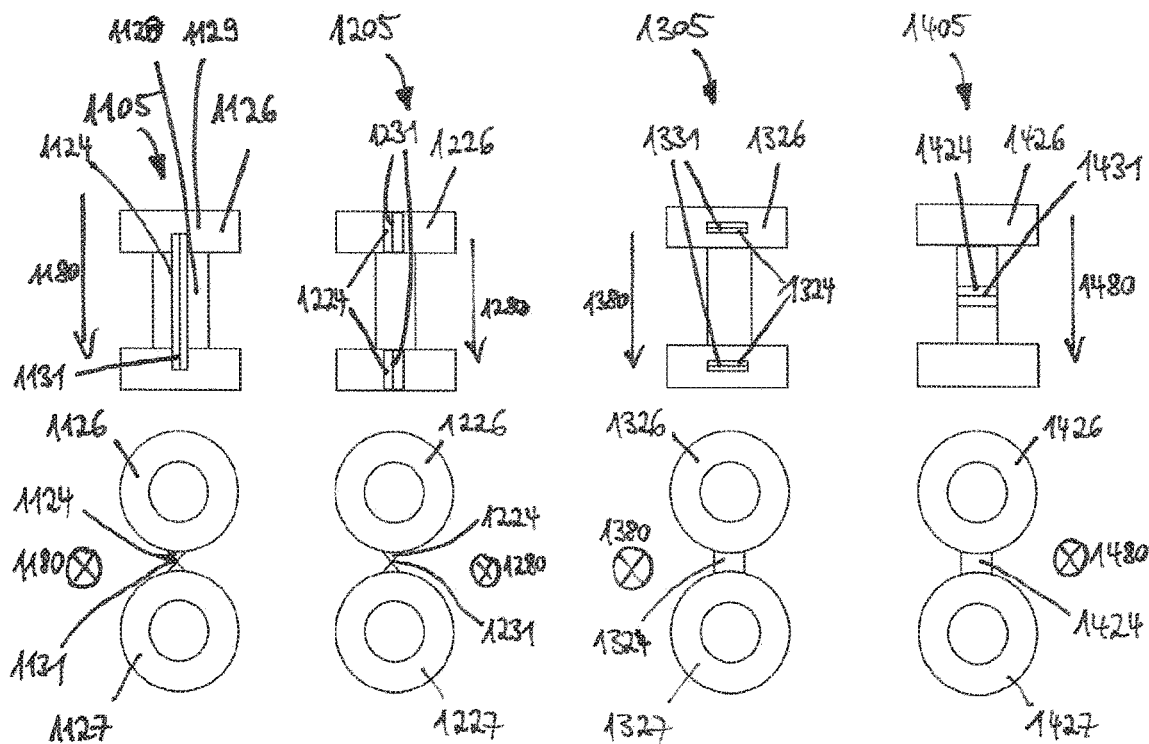
Figure 19:
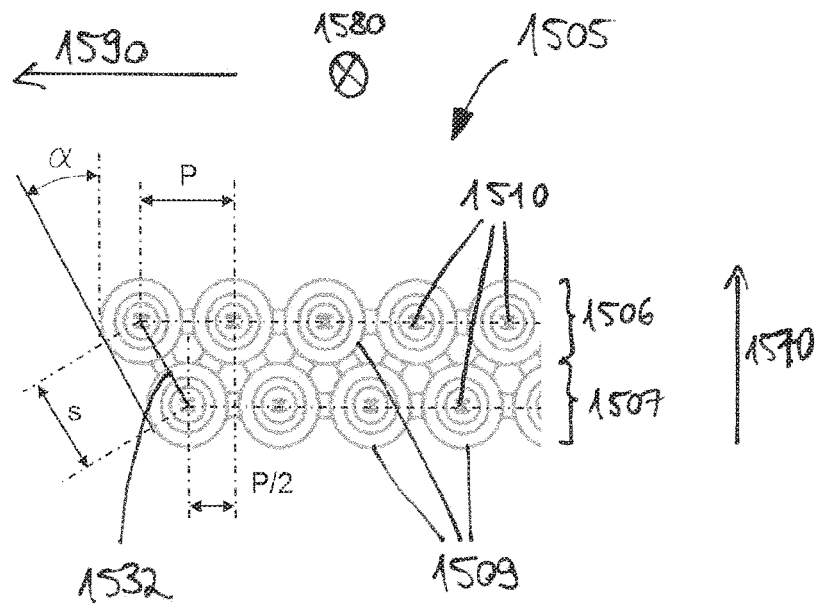
Figure 20:
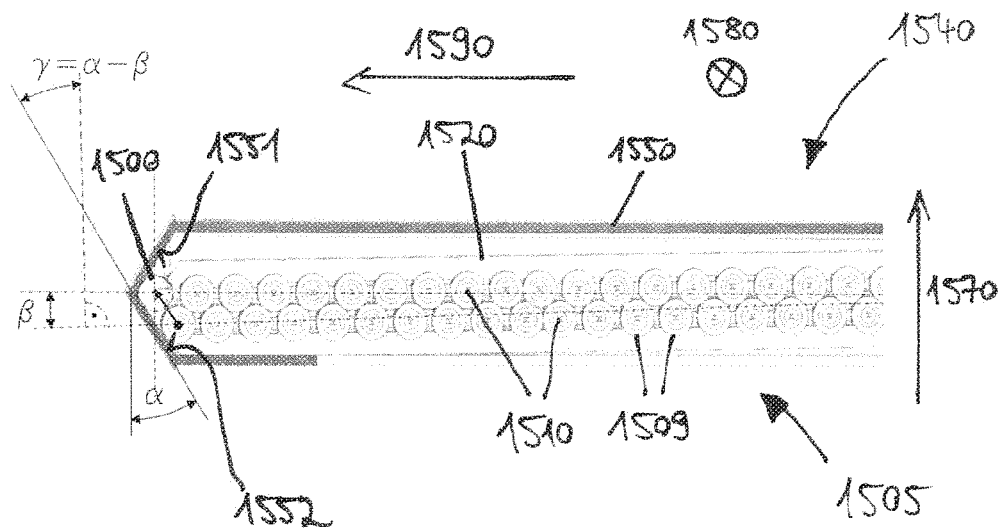
Figure 21:
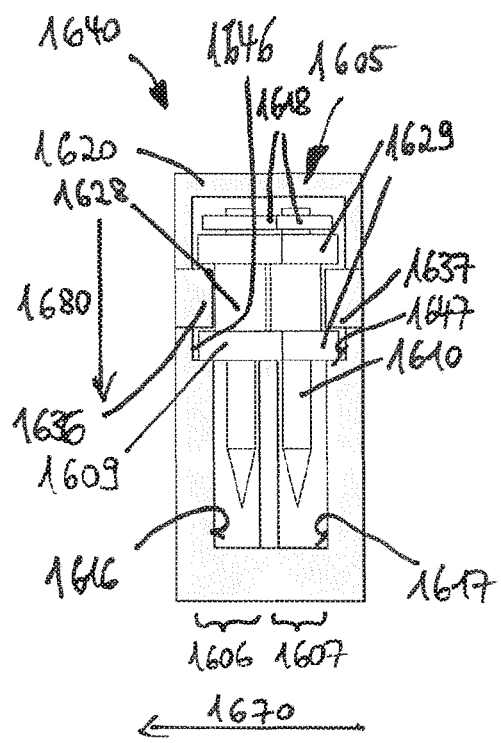
Figure 22:
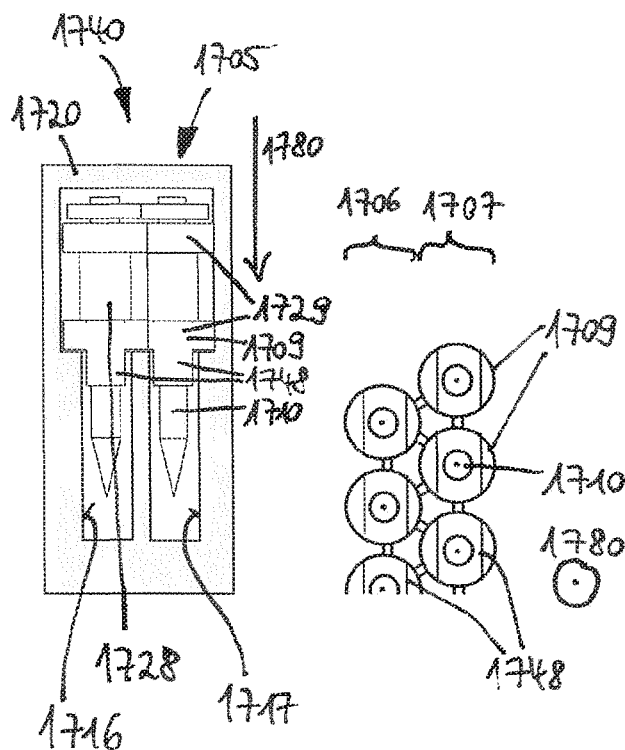
Figure 23:
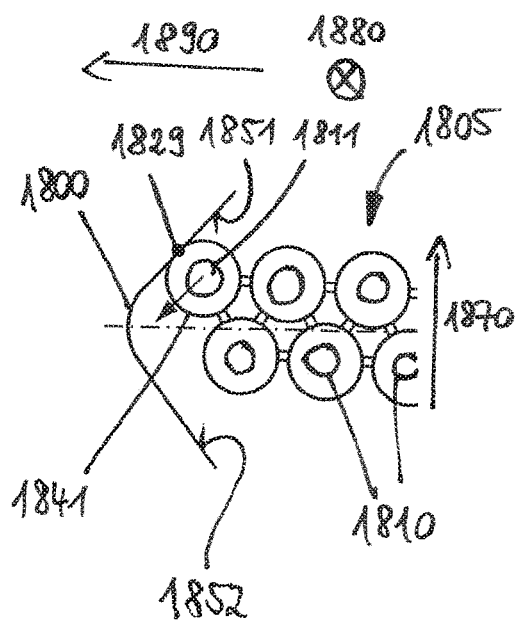
Figure 24:
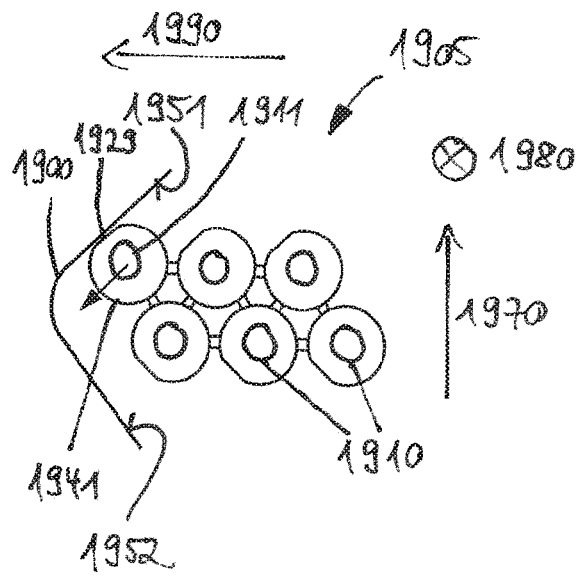
Figure 25:
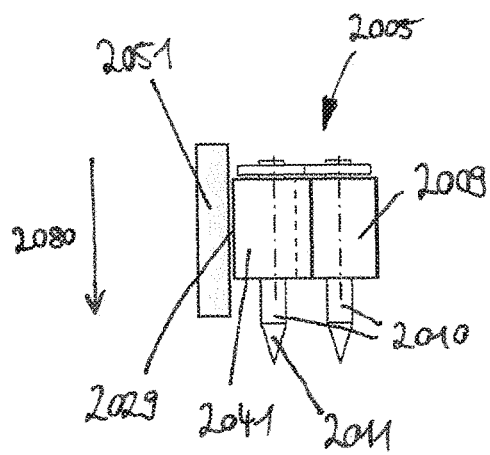
Figure 26:
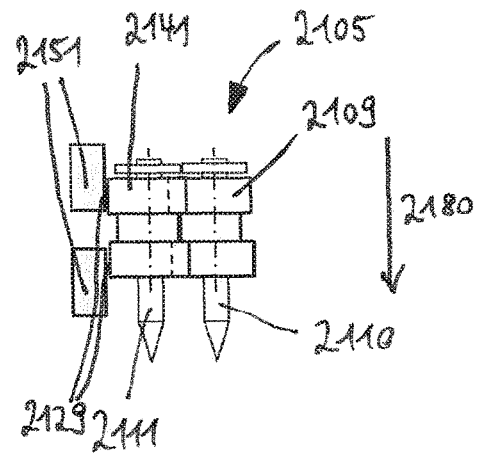
Figure 27:
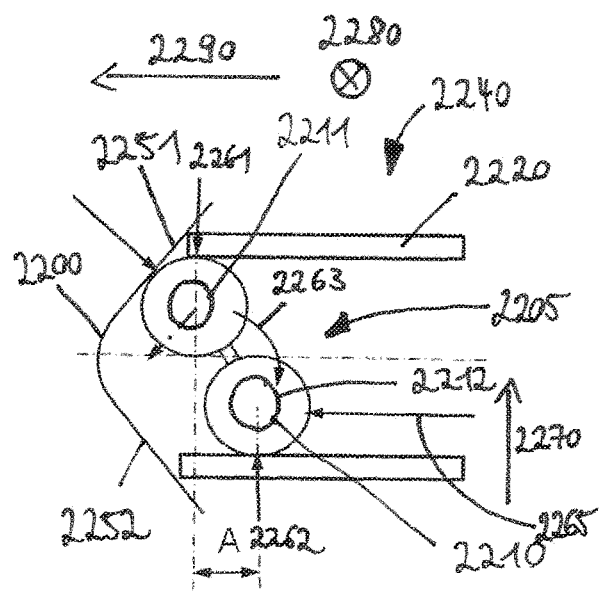
Figure 28:
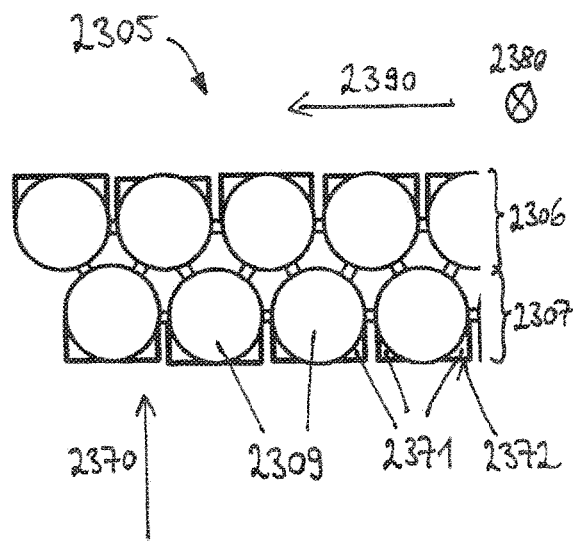
Figure 29:
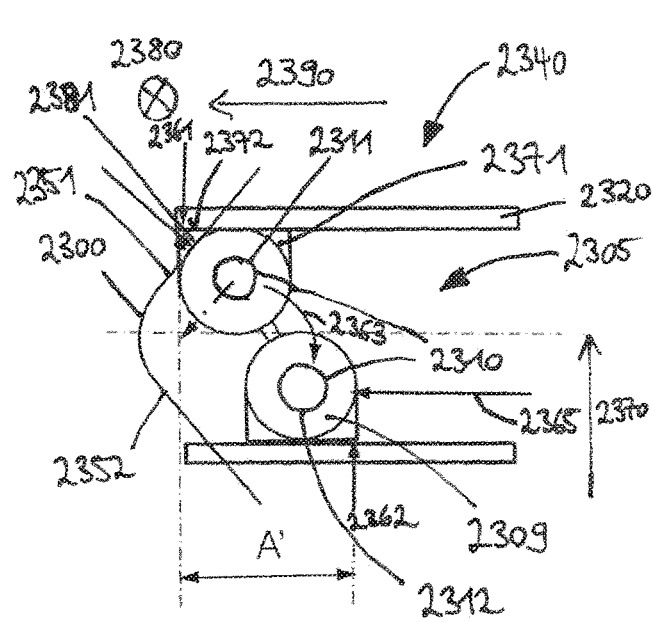
Figure 30:
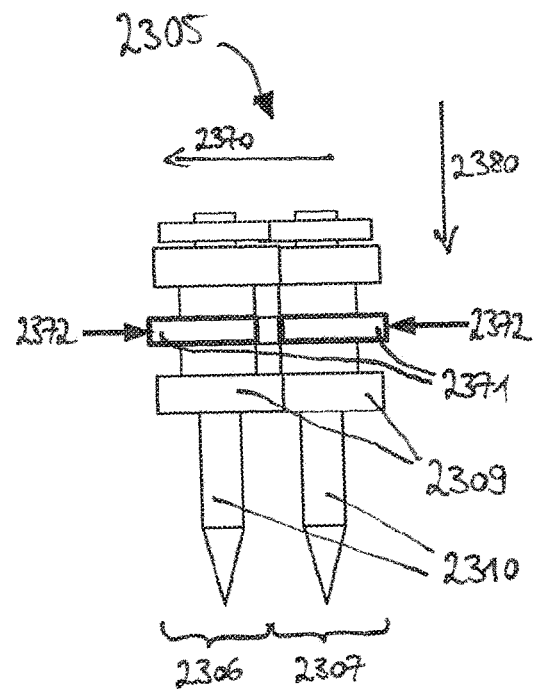
Figure 31:
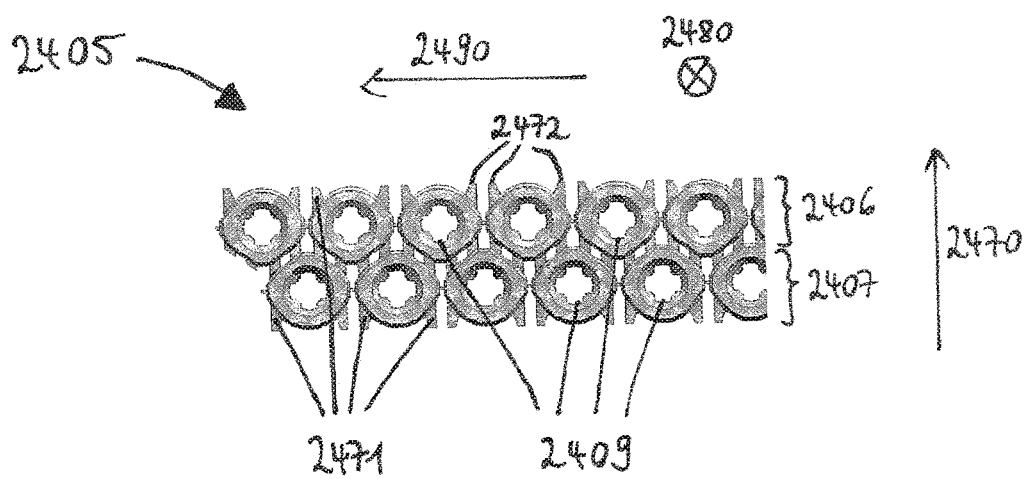

Embodiments of an apparatus for driving a fastening element into a substrate will be explained below in more detail by way of examples, with reference to the drawings, wherein:

FIG. 1 shows a side view of a driving apparatus,
FIG. 2 shows a side view of a driving apparatus with the housing open,
FIG. 3 shows a plan view of a magazine,
FIG. 4 shows a partial view of a magazine in two different positions,
FIG. 5 shows a plan view of a magazine,
FIG. 6 shows a partial view of a magazine in two different positions,
FIG. 7 shows a plan view of a magazine,
FIG. 8 shows a plan view of a magazine,
FIG. 9 shows a sectional view of a setting channel and a magazine in two different positions,
FIG. 10 shows a setting channel and a fastening element strip,
FIG. 11 shows a plan view of a fastening element strip,
FIG. 12 shows a plan view of a fastening element strip,
FIG. 13 shows a plan view of a fastening element strip,
FIG. 14 shows a plan view of a fastening element strip,
FIG. 15 shows a cross-section and a plan view of a fastening element strip,
FIG. 16 shows a cross-section and a plan view of a fastening element strip,
FIG. 17 shows a cross-section and a plan view of a fastening element strip,
FIG. 18 shows a cross-section and a plan view of a fastening element strip,
FIG. 19 shows a partial view of a fastening element strip,
FIG. 20 shows a partial view of a magazine,
FIG. 21 shows a sectional view of a magazine and a fastening element strip,
FIG. 22 shows a sectional view of a magazine and a fastening element strip, and a partial view of the fastening element strip,
FIG. 23 shows a setting channel and a fastening element strip,
FIG. 24 shows a setting channel and a fastening element strip,
FIG. 25 shows a sectional view of a magazine and a fastening element strip,
FIG. 26 shows a sectional view of a magazine and a fastening element strip,
FIG. 27 shows a setting channel and a fastening element strip,
FIG. 28 shows a partial view of a fastening element strip,
FIG. 29 shows a setting channel and a fastening element strip,
FIG. 30 shows a sectional view of a fastening element strip, and
FIG. 31 shows a partial view of a fastening element strip.

DETAILED DESCRIPTION OF THE INVENTION

FIG. 1 shows a side view of a driving apparatus 10 for driving a fastening element, such as a nail or a bolt, into a substrate which is not illustrated. The driving apparatus 10 has an energy transmitting element, which is not shown, for transmitting energy to the fastening element, and a housing 20 in which the energy transmitting element and a drive device (likewise not shown) used to propel the energy transmitting element are accommodated.

The driving apparatus 10 furthermore has a handle 30, a magazine 40, and a bridge 50 connecting the handle 30 to the magazine 40. The magazine is not removable. A scaffold hook 60 for hanging the driving apparatus 10 on a scaffold or the like, and an electrical energy storage device, designed as a battery 59, are attached to the bridge 50. A trigger 34 and a grip sensor designed as a hand switch 35 are arranged on the handle 30. An alignment aid 45 assists in orienting the driving apparatus perpendicular to a substrate.

Furthermore, the driving apparatus 10 has a setting channel 99 for guiding the fastening element, and a contact pressure device 71 for detecting the distance of the driving apparatus 10 from a substrate, which is not shown. For this purpose, the contact pressure device 71 comprises a contact pressure element which is displaced relative to the magazine 40 when the driving apparatus 10 is pressed against the substrate. The contact pressure element is formed by the setting channel 99. In embodiments not shown, the contact pressure element is arranged next to the setting channel and projects beyond it in the direction of the substrate when un-pressed. The magazine 40 serves to transport fastening elements in a transport direction 90 to the setting channel 99.

FIG. 2 shows the driving apparatus 10 with the housing 20 open. The housing 20 accommodates a drive device 70 for propelling an energy transmitting element 75, which is partially concealed in the drawing. The energy transmitting element 75 is moved in a fastening direction 80 in order to transmit energy to each of the fastening elements transported from the magazine 40 into the setting channel 99.

The drive device 70 comprises an electric motor, which is not shown, for converting electrical energy from the battery 59 into rotational energy, a transmission 41 comprising a torque transmitting device for transmitting a torque of the electric motor to a motion converter designed as a spindle drive 31, and a force transmitting device comprising a pulley 26 for transmitting a force from the motion converter to a mechanical energy storage device designed as a spring 21 and for transmitting a force from the spring to the energy transmitting element.

In embodiments not illustrated, the drive device for propelling the energy transmitting element is operated by means of a flywheel, compressed air, gas combustion, or powder combustion.

FIGS. 3 and 4 show an embodiment of a magazine 140 in a plan view. Fastening elements 110 are inserted into the magazine 140, and are transported in a transport direction 190 into a setting channel 100. The fastening elements 110 are designed as nails, and define a fastening direction 180 extending into the plane of the drawing, such that only the heads of the fastening elements 110 can be seen in FIGS. 3 and 4. The fastening elements 110 are arranged in two rows, which are arranged one behind the other in a transverse direction 170 oriented perpendicular to the transport direction 190 and perpendicular to the fastening direction 180. In embodiments not illustrated, the fastening elements are arranged in three or more rows, which are arranged one behind the other in the transverse direction. The magazine 140 transports the fastening elements 110 of the two rows alternately into the setting channel.

The magazine 140 comprises a magazine housing 150 which has a first insertion bevel 151 and a second insertion bevel 152. The first insertion bevel 151 is angled with respect to the transport direction 190, and serves to guide the foremost fastening element 111, as seen in the transport direction 190, of the row of fastening elements 110 which is at top in both FIGS. 3 and 4, into the setting channel 100. The second insertion bevel 152 is also angled with respect to the transport direction 190, and serves to guide the foremost fastening element 112, as seen in the transport direction 190, of the row of fastening elements 110 which is at bottom in both FIGS. 3 and 4, into the setting channel 100 after the foremost fastening element 111 of the upper row has been driven and has exited both the magazine 140 and the setting channel 100, as illustrated in FIG. 4. The magazine housing 150 and thus the first insertion bevel 151 and the second insertion bevel 152 are rigidly connected to the setting channel 100. In embodiments not shown, the insertion bevels are formed separately from the magazine or its housing. In any case, the insertion bevels are preferably rigidly connected to the setting channel.

The magazine 140 has a guide channel 120 for guiding the two rows of fastening elements 110 into the setting channel 100. An opening 125 of the guide channel 120 opens into the setting channel 100. The opening 125 can move back and forth in the transverse direction 170 between a first position, which is shown on the left in FIG. 4, and a second position, which is shown on the right in FIG. 4. For this purpose, the guide channel 120 is mounted so as to be pivotable about a pivot axis 130 which is offset relative to the setting channel and oriented into the plane of the drawing of FIG. 3, parallel to the fastening direction 180. The pivot axis 130 intersects an imaginary extension of the guide channel 120 in the direction opposite the transport direction 190—that is, to the right in FIG. 3. In embodiments not shown, the guide channel is displaceable in parallel between the corresponding first and second positions.

When the two rows of fastening elements 110 are guided in the pivotable guide channel 120, it is advantageously possible for the first insertion bevel 151 to align the upper row in FIG. 3 with the setting channel 100 as the foremost fastening element 111 of the upper row slides over the first insertion bevel 151. Analogously, it is advantageously possible for the second insertion bevel 152 to align the lower row in FIG. 3 with the setting channel 100 as the foremost fastening element 112 of the lower row slides over the second insertion bevel 152.

Furthermore, the magazine 140 has a feed element 160 which applies a force 165 to the fastening elements 110 in the transport direction 190 to transport the fastening elements 110. For this purpose, the feed element 160 has a plurality of contact surfaces 161, 162 which are offset relative to each other in the transport direction 190, each of which contacts one of the plurality of rows of fastening elements 110. A first contact surface 161 contacts the upper row of fastening elements 110 in FIG. 3, whereas a second contact surface 162 contacts the lower row of fastening elements 110 in FIG. 3. The feed element 160 can move in the transport direction 190 and is guided in a guide rail 195. The guide rail 195 is a part of the magazine housing 150, or is rigidly connected to the magazine housing 150. A spring, which is not shown—for example, a scroll spring—applies a force to the feed element 160 toward the setting channel 100 in the transport direction 190. To bias the spring, the feed element 160 is pushed manually by a user of the driving apparatus against the transport direction 190 in FIG. 3, to the right, and released after the insertion of the fastening elements 110, and/or brought into contact with the fastening elements 110.

FIG. 5 is a partial plan view of a magazine 240. Fastening elements 210 are inserted into the magazine 240, and are transported in a transport direction 290 into a setting channel, which is not shown. The fastening elements 210 define a fastening direction 280 extending into the plane of the drawing, such that only the heads of the fastening elements 210 can be seen in FIG. 5. The fastening elements 210 are arranged in two rows, which are arranged one behind the other in a transverse direction 270 oriented perpendicular to the transport direction 290 and perpendicular to the fastening direction 280. The magazine 240 transports the fastening elements 210 of the two rows alternately into the setting channel.

The magazine 240 comprises a magazine housing 250 and a guide channel 220 for guiding the two rows of fastening elements 210 into the setting channel. The guide channel 220 can move back and forth in the transverse direction 270. In addition, the magazine 240 has a feed element 260 which applies a force 265 to the fastening elements 210 in the transport direction 290 to transport the fastening elements 210. For this purpose, the feed element 260 has exactly one contact surface 261 to contact only one of the plurality of rows of fastening elements 210. The feed element 260 can move in the transport direction 290 and is guided in a guide rail 295. The guide rail 295 is a part of the magazine housing 250, or is rigidly connected to the magazine housing 250. The feed element 260 in this case is arranged at an offset relative to the guide channel 220 in the fastening direction 280.

The back and forth movement 222 of the guide channel 220 in the transverse direction 270, and of the fastening elements 210 guided therein, creates a back and forth movement 222 opposing a frictional force FR, which must be overcome by the feed element 260 during transport of the fastening elements 210.

FIG. 6 is a partial illustration of a magazine 340 in plan view. Fastening elements 310 are inserted into the magazine 340, and are transported in a transport direction 390 into a setting channel, which is not shown. The fastening elements 310 define a fastening direction 380 extending into the plane of the drawing, such that only the heads of the fastening elements 310 can be seen in FIG. 6. The fastening elements 310 are arranged in two rows, which are arranged one behind the other in a transverse direction 370 oriented perpendicular to the transport direction 390 and perpendicular to the fastening direction 380. The magazine 340 transports the fastening elements 310 of the two rows alternately into the setting channel.

The magazine 340 comprises a magazine housing 350 and a guide channel 320 for guiding the two rows of fastening elements 310 into the setting channel. The guide channel 320 can move back and forth in the transverse direction 370 between a first position, which is shown in FIG. 6 at top, and a second position, which is shown in FIG. 6 at bottom. In addition, the magazine 340 has a feed element 360 which applies a force 365 to the fastening elements 310 in the transport direction 390 to transport the fastening elements 310. For this purpose, the feed element 360 has a contact surface 361 to contact the plurality of rows of fastening elements 310. The feed element 360 can move in the transport direction 390 and is guided in a guide rail 395. The guide rail 395 is part of the guide channel 320, or is rigidly connected to the guide channel 320. A frictional force between the feed element 360 and the fastening elements 310 in the transverse direction 370 is avoided in this way. As a result, the back and forth movement of the guide channel 320 in the transverse direction 370 necessarily also moves the mass of the feed element 360, as well as the mass of the guide rail 395.

FIG. 7 is a partial illustration of a magazine 440 in plan view. Fastening elements 410 are inserted into the magazine 440, and are transported in a transport direction 490 into a setting channel, which is not shown. The fastening elements 410 define a fastening direction 480 extending into the plane of the drawing, such that only the heads of the fastening elements 410 can be seen in FIG. 7. The fastening elements 410 are arranged in two rows, which are arranged one behind the other in a transverse direction 470 oriented perpendicular to the transport direction 490 and perpendicular to the fastening direction 480. The magazine 440 transports the fastening elements 410 of the two rows alternately into the setting channel.

The magazine 440 comprises a magazine housing 450 and a guide channel 420 for guiding the two rows of fastening elements 410 into the setting channel. The guide channel 420 can move back and forth in the transverse direction 470. In addition, the magazine 440 has a feed element 460 which applies a force 465 to the fastening elements 410 in the transport direction 490 to transport the fastening elements 410. For this purpose, the feed element 460 has a plurality of contact surfaces 461, 462 which are offset relative to each other in the transport direction 490, each of which contacts one of the plurality of rows of fastening elements 410. A first contact surface 461 contacts the upper row of fastening elements 410 in FIG. 7, whereas a second contact surface 462 contacts the lower row of fastening elements 410 in FIG. 7. The feed element 460 can move in the transport direction 490 and is guided in a guide rail 495. The guide rail 495 is part of the guide channel 420 or is rigidly connected to the guide channel 420.

FIG. 8 is a partial illustration of a magazine 540 in plan view. Fastening elements 510 are inserted into the magazine 540, and are transported in a transport direction 590 into a setting channel, which is not shown. The fastening elements 510 define a fastening direction 580 extending into the plane of the drawing, such that only the heads of the fastening elements 510 can be seen in FIG. 7. The fastening elements 510 are arranged in two rows, which are arranged one behind the other in a transverse direction 570 oriented perpendicular to the transport direction 590 and perpendicular to the fastening direction 580. The magazine 540 transports the fastening elements 510 of the two rows alternately into the setting channel.

The magazine 540 comprises a magazine housing 550 and a guide channel 520 for guiding the two rows of fastening elements 510 into the setting channel. The guide channel 520 can move back and forth in the transverse direction 570. In addition, the magazine 540 has a feed element 560 which applies a force 565 to the fastening elements 510 in the transport direction 590 to transport the fastening elements 510. For this purpose, the feed element 560 has a plurality of contact surfaces 561, 562 which are offset relative to each other in the transport direction 590, each of which contacts one of the plurality of rows of fastening elements 510. A first contact surface 561 contacts the upper row of fastening elements 510 in FIG. 8, whereas a second contact surface 562 contacts the lower row of fastening elements 510 in FIG. 8. The feed element 560 can move in the transport direction 590 and is guided in a guide rail 595. The guide rail 595 is a part of the magazine housing 550, or is rigidly connected to the magazine housing 550. In order to nevertheless allow following the back and forth movement of the guide channel 520 and thus of the fastening elements 510 in the transverse direction 570, the feed element 560 is mounted to enable movement relative to the guide rail 595 in the direction of the arrows 563, and thus in the transverse direction 570.

FIG. 9 illustrates a setting channel 600 and a magazine 640 twice, in a sectional view. Fastening elements 610 are inserted into the magazine 640, and are transported in a transport direction 690 out of the plane of the drawing, into a setting channel 600. The fastening elements 610 define a fastening direction 680. The fastening elements 610 are arranged in two rows, which are arranged one behind the other in a transverse direction 670 oriented perpendicular to the transport direction 690 and perpendicular to the fastening direction 680. The magazine 640 transports the fastening elements 610 of the two rows alternately into the setting channel.

The magazine 640 comprises a magazine housing 650 and a guide channel 620 for guiding the two rows of fastening elements 610 into the setting channel 600. An opening 625 of the guide channel 620 opens into the setting channel 600. The opening 625 can move back and forth in the transverse direction 670 between a first position, which is shown on the left in FIG. 9, and a second position, which is shown on the right in FIG. 9. For this purpose, the guide channel 620 is mounted so as to be pivotable about a pivot axis 130 which is offset into the plane of the drawing relative to the setting channel 600, and oriented parallel to the fastening direction 680.

The setting channel 600 and the magazine 640 are parts of a driving apparatus, which further comprises a contact pressure device 671 with a contact pressure element 672. The contact pressure element 672 has a first force transmission surface 673 for transmitting a force 676 to the guide channel 620 in the direction opposite the transverse direction 670, and a second force transmission surface 674 for transmitting a force to the guide channel 620 in the direction opposite the transverse direction 670. The guide channel 620 in turn has a first counter surface 677 for transmitting the force 676 in the direction opposite the transverse direction 670, and a second counter surface 678 for transmitting the force in the direction opposite the transverse direction 670. As soon as the driving apparatus is pressed against a substrate in the fastening direction 680, the contact pressure element 672 is displaced relative to the magazine 640, and thus the setting channel 620 is displaced in the direction opposite the fastening direction 680, such that the first force transmission surface 673 comes into contact with the first counter surface 677 and the force 676 is applied opposite the transverse direction 670 on the guide channel 620, and ultimately on the fastening elements 610. The opening 625 of the guide channel 620 and the fastening elements 610 are thereby moved into the second position shown on the right in FIG. 9, such that a foremost fastening element 611, as seen in the transport direction 690, of the plurality of fastening elements 610 is positioned in the setting channel 600. The first force transmission surface 673 acts as a control surface for guiding the foremost fastening element 611 into the setting channel 600 in the transport direction 690. The first counter surface 677 acts as a control surface counter surface for the controlled movement of the opening 625 into the second position when the first force transmission surface 673 engages with the first counter surface 677.

FIG. 10 illustrates a setting channel 700 and a fastening element strip 705 with fastening elements 710 in a partial plan view. The fastening elements 710 are transported in a magazine, which is not shown, into the setting channel 700 in a transport direction 190. The fastening elements 710 are designed as nails and define a fastening direction 780 extending into the drawing plane, such that only the heads of the fastening elements 710 can be seen in FIG. 10. The fastening elements 710 are arranged in two rows, which are arranged one behind the other in a transverse direction 770 oriented perpendicular to the transport direction 790 and perpendicular to the fastening direction 780.

A first insertion bevel 751 and a second insertion bevel 752 are rigidly fixed to the setting channel 700. The first insertion bevel 751 is angled with respect to the transport direction 790 and serves to guide the foremost fastening element 711, as seen in the transport direction 790, of the upper row of fastening elements 710 in FIG. 10 toward the setting channel 700 in a first direction 753 parallel to the first insertion bevel 751—at least up to an intermediate position 715 shown in dashed lines. The desired positioning of the foremost fastening element 711, as seen in the transport direction 790, of the top row of fastening elements 710 in FIG. 10 in the setting channel 700 is then preferably accomplished or ensured by means of a contact pressure element analogous to FIG. 9, as the foremost fastening element 711 is moved in a second direction 754 into the setting channel 700. The second direction 754 is more sharply angled with respect to the transport direction 790 than the first direction 753, such that a lower inclination angle of the first insertion bevel 751 relative to the transport direction 790 is possible with the same arrangement of the fastening elements 710 in the fastening element strip 705. As a result, frictional forces between the foremost fastening element 711 and the first insertion bevel 751, as well as the risk of the fastening element strip 705 becoming jammed, are reduced in certain circumstances.

The second insertion bevel 752 is also angled with respect to the transport direction 790 and serves to guide the foremost fastening element 712, as seen in the transport direction 790, of the bottom row of fastening elements 710 in FIG. 10 into the setting channel 100 after the foremost fastening element 711 of the upper row has been set and has exited the setting channel 700.

FIG. 11 shows a fastening element strip 805 in plan view, which comprises two rows 806, 807 of receptacles 809 oriented in a transport direction 890, as well as fastening elements 810 which are accommodated in the receptacles 809 and which define a fastening direction 880 directed into the plane of the drawing. The rows 806, 807 of receptacles 809, and therefore of fastening elements 810, are arranged one behind the other in a transverse direction 870 oriented perpendicular to the transport direction 890 and perpendicular to the fastening direction 880.

The fastening element strip 805 has a plurality of first connecting webs 821, each of which connects two adjacent receptacles within a first row 806 of receptacles 809. The fastening element strip 805 also has a plurality of second connecting webs 822, each of which connects two adjacent receptacles within a second row 807 of receptacles 809. Furthermore, the fastening element strip 805 has a plurality of third connecting webs 823, each of which connects a receptacle of the first row 806 to a receptacle of the second row 807.

In this case, each receptacle of the first row 806 is connected to an adjacent receptacle of the second row 807 directly via a third connecting web 823. The first connecting webs 821 and the second connecting webs 822 are oriented parallel to the transport direction 890, whereas the third connecting webs 823 are oriented at an angle with respect to both the transport direction 890 and the transverse direction 870. In addition, each receptacle is offset relative to all other receptacles of the rows 806, 807 in the transport direction 890. The offset P/2 measured in the transport direction 890 between two receptacles which are directly adjacent in the transport direction 890 is the same for all receptacles—specifically, exactly half the offset P between two receptacles which are directly adjacent within one of the rows 806, 807.

The first connecting webs 821, second connecting webs 822, third connecting webs 823, and receptacles 809 are formed together as an integral part which is made of plastic and is produced, for example, by means of an injection molding process. As a result, each receptacle of the first row 806 is rigidly connected to at least one receptacle of the second row 807. An appropriate selection of the material and dimensions of the connecting webs 821, 822, 823 enables achieving a desired rigidity of the fastening element strip 805. In embodiments not shown, the two or more rows of receptacles are first produced separately and then connected to each other—for example, locked together, welded or glued. In further embodiments which are not shown, the receptacles and/or the connecting webs are made at least partially of plastic, metal, paper or several of the named materials.

FIG. 12 shows a plan view of a fastening element strip 905 which comprises two rows 906, 907 of receptacles 909 oriented in a transport direction 990, as well as fastening elements (not shown) which are received in the receptacles 909 and define a fastening direction 980 which extends into the plane of the drawing. The rows 906, 907 of receptacles 909 are arranged one behind the other in a transverse direction 970 which is oriented perpendicular to the transport direction 990 and perpendicular to the fastening direction 980.

The fastening element strip 905 has a plurality of first connecting webs 921, each of which connects two adjacent receptacles within a first row 906 of receptacles 909. The fastening element strip 905 also has a plurality of second connecting webs 922, each of which connects two adjacent receptacles within a second row 907 of receptacles 909. Furthermore, the fastening element strip 905 has a plurality of third connecting webs 923, each of which connects a receptacle of the first row 906 to a receptacle of the second row 907.

In this case, each receptacle of the first row 906 is connected to an adjacent receptacle of the second row 907 directly via a third connecting web 923. The first connecting webs 921 and the second connecting webs 922 are oriented parallel to the transport direction 990, whereas the third connecting webs 923 are oriented perpendicular to the transport direction 990 and parallel to the transverse direction 970. In addition, each receptacle is offset relative to all other receptacles of the rows 906, 907 in the transport direction 890 by the same distance.

FIGS. 13 and 14 show a plan view of a fastening element strip 1005 which comprises two rows 1006, 1007 of receptacles 1009 oriented in a transport direction 1090, as well as fastening elements (not shown) which are received in the receptacles 1009 and define a fastening direction 1080 which extends into the plane of the drawing. The rows 1006, 1007 of receptacles 1009 are arranged one behind the other in a transverse direction 1070 which is oriented perpendicular to the transport direction 1090 and perpendicular to the fastening direction 1080.

The fastening element strip 1005 has a plurality of connecting webs 1023, each of which connects a receptacle of the first row 1006 to a receptacle of the second row 1007. In this case, each receptacle of the first row 1006 is connected to an adjacent receptacle of the second row 1007 directly via a connecting web 1023. However, each receptacle of the first row 1006 or the second row 1007, respectively, is only indirectly connected to an adjacent receptacle of the same row 1006, 1007—specifically via a receptacle of the other row 1007, 1006, respectively. This allows two adjacent receptacles of the same row 1006, 1007 to move towards each other until they touch. The rigidity of the fastening element strip 1005 is thus reduced.

If the fastening element strip 1005 is inserted into a guide channel 1020 of a magazine 1040 of a drive apparatus, which is not shown, and a feed element (not shown) applies a force 1065 to it in the transport direction, as shown in FIG. 14, the fastening element strip 1005 can then be compressed in the transport direction 1005 such that its width increases in the transverse direction 1070. On the other hand, prior to compression, the fastening element strip 1005 has a smaller width in the transverse direction 1070 and is easier to insert into or remove from the magazine 1040.

FIG. 15 shows a section of a fastening element strip 1105—in a plan view at the bottom and in a cross-sectional view at the top. The fastening element strip 1105 has a first receptacle 1126 for a fastening element, which is not shown, and a second receptacle 1127 for a further fastening element, which is not shown. The receptacles 1126, 1127 define a fastening direction 1180. The receptacle 1126 comprises a hollow shaft 1128 and two guide ridges 1129 which guide the fastening element extending through the shaft 1128 and the guide ridges 1129 into a setting channel, which is not shown, while the fastening element is being driven into a substrate.

The fastening element strip 1105 comprises a connecting web 1124 that directly connects the receptacles 1126, 1127 to each other. The connecting web 1124 has a predetermined breaking point 1131 which is oriented parallel to the fastening direction 1180 and is designed, for example, as a line-shaped material constriction. This facilitates separation of the first receptacle 1126 and the fastening element received therein from the second receptacle 1127, and thus from the rest of the fastening element strip 1105.

FIG. 16 shows a section of a fastening element strip 1205—in a plan view at the bottom and in a cross-sectional view at the top. The fastening element strip 1205 has a first receptacle 1226 for a fastening element, which is not shown, and a second receptacle 1227 for a further fastening element, which is not shown. The receptacles 1226, 1227 define a fastening direction 1280. The fastening element strip 1205 comprises two connecting webs 1224 which directly connect the receptacles 1226, 1227 to each other. Each of the connecting webs 1224 has a predetermined breaking point 1231 which is oriented parallel to the fastening direction 1280 and is formed as a line-shaped material constriction.

FIG. 17 shows a section of a fastening element strip 1305—in a plan view at the bottom and in a cross-sectional view at the top. The fastening element strip 1305 has a first receptacle 1326 for a fastening element, which is not shown, and a second receptacle 1327 for a further fastening element, which is not shown. The receptacles 1326, 1327 define a fastening direction 1380. The fastening element strip 1305 comprises two connecting webs 1324 which directly connect the receptacles 1326, 1327 to each other. Each of the connecting webs 1324 has a predetermined breaking point 1331 which is oriented perpendicular to the fastening direction 1380 and is formed as a line-shaped material constriction.

FIG. 18 shows a section of a fastening element strip 1405—in a plan view at the bottom and in a cross-sectional view at the top. The fastening element strip 1405 has a first receptacle 1426 for a fastening element, which is not shown, and a second receptacle 1427 for a further fastening element, which is not shown. The receptacles 1426, 1427 define a fastening direction 1480. The fastening element strip 1405 comprises two connecting webs 1424 which directly connect the receptacles 1426, 1427 to each other. The connecting web 1424 has a predetermined breaking point 1431 which is oriented perpendicular to the fastening direction 1380 and is formed as a linear material constriction.

FIGS. 19 and 20 show a partial plan view of a fastening element strip 1505 which comprises two rows 1506, 1507 of receptacles 1509 oriented in a transport direction 1590, as well as fastening elements 1510 which are received in the receptacles 1509 and which define a fastening direction 1580 oriented into the plane of the drawing. The rows 1506, 1507 of receptacles 1509, and therefore of fastening elements 1510, are arranged one behind the other in a transverse direction 1570 oriented perpendicular to the transport direction 1590 and perpendicular to the fastening direction 1580.

Each of the receptacles 1509 is offset relative to all other receptacles of the rows 1506, 1507 in the transport direction 1590. The offset P/2 measured in the transport direction 1590 between two receptacles which are directly adjacent in the transport direction 1590 is the same for all receptacles—specifically, exactly half the offset P between two receptacles which are directly adjacent within one of the rows 1506, 1507. The shortest connecting line 1532 between two directly adjacent receptacles of different rows 1506, 1507 is oriented at an angle $\alpha$ to the transverse direction 1570. A length of the connecting line 1532 or distance s between two directly adjacent receptacles of different rows 1506, 1507 is preferably equal to the offset P between two consecutive receptacles within one of the rows 1506, 1507. Because P/2=s, in this preferred configuration $\alpha=30°$.

The fastening element strip 1505 is inserted into a magazine 1540, which in turn transports the fastening elements 1510 successively down the row into a setting channel 1500. The magazine 1540 comprises a magazine housing 1550 which has a first insertion bevel 1551 and a second insertion bevel 1552. The first insertion bevel 1551 and the second insertion bevel 1552 are each oriented at an angle $\gamma$ relative to the transverse direction 1570. The magazine 1540 has a guide channel 1520 for guiding the fastening elements 1510 into the setting channel 1500. The guide channel 1520 is mounted so as to be pivotable by a pivoting angle β about a pivot axis, which is not shown, which is offset relative to the setting channel, and which is oriented parallel to the fastening direction 1580. A maximum angle of inclination γ of the insertion bevels 1551, 1552 relative to the transverse direction 1570 is then γ=α–β. The greatest possible angle of inclination γ is advantageous to reduce the frictional resistance between the fastening element strip 1505 and the insertion bevels 1551, 1552.

FIG. 21 shows a magazine 1640 and a fastening element strip 1605 in a sectional view. The magazine comprises a guide channel 1620 into which the fastening element strip 1605 is inserted. The fastening element strip 1605 comprises two rows 1606, 1607 of receptacles 1609, as well as fastening elements 1610 which are received in the receptacles 1609 and define a fastening direction 1680. The rows 1606, 1607 of receptacles 1609, and thus of fastening elements 1610, are arranged one behind the other in a transverse direction 1670. Each of the receptacles 1609 comprises a hollow shaft 1628 and two guide ridges 1629 which guide the fastening element extending through the shaft 1628 and the guide ridges 1629 into a setting channel, which is not shown, while the fastening element is being driven into a substrate. Heads 1618 of the fastening elements 1610 may also serve as such a guide in certain circumstances.

To guide the rows 1606, 1607 of fastening elements 1610, the guide channel 1620 comprises a first guide groove 1616 for the first row 1606 and a second guide groove 1617 for the second row 1607. In addition, the guide channel 1620 has a first guide projection 1636 functionally assigned to the first row 1606 and a second guide projection 1637 functionally assigned to the second row 1607. The guide projections 1636, 1637 engage in a space between the guide ridges 1629. In addition, the guide channel 1620 has a first guide recess 1646 functionally assigned to the first row 1606 and a second guide recess 1647 functionally assigned to the second row 1607. Each of the guide recesses 1646, 1647 receives one of the guide ridges 1629.

FIG. 22 shows a magazine 1740 and a fastening element strip 1705—in a sectional view on the left and in a plan view on the right. The magazine comprises a guide channel 1720 into which the fastening element strip 1705 is inserted. The fastening element strip 1705 comprises two rows 1706, 1707 of receptacles 1709, as well as fastening elements 1710 which are received in the receptacles 1709 and which define a fastening direction 1780. Each of the receptacles 1709 comprises a hollow shaft 1728 and two guide ridges 1729 which guide the fastening element 1710 extending through the shaft 1728 and the guide ridges 1729 into a setting channel, which is not shown, while the fastening element is being driven into a substrate.

The guide channel 1720 comprises a first guide groove 1716 and a second guide groove 1717 to guide the fastening elements 1710. In addition, each of the guide ridges 1729 which points in the fastening direction has an extension 1748 which engages in the respective guide groove 1716, 1717 and improves the guidance of the fastening elements 1710 in the respective guide groove 1716, 1717. The extensions 1748 are preferably each formed as a dihedron.

In FIG. 23, a setting channel 1800 and a fastening element strip 1805 with fastening elements 1810 are shown in a partial plan view. The fastening elements 1810 are transported in a magazine, which is not shown, into the setting channel 1800 in a transport direction 1890. The fastening elements 1810 are designed as nails and define a fastening direction 1880 extending into the drawing plane, such that only the heads of the fastening elements 1810 can be seen in FIG. 23. The fastening elements 1810 are arranged in two rows, which are arranged one behind the other in a transverse direction 1870 oriented perpendicular to the transport direction 1890 and perpendicular to the fastening direction 1880.

A first insertion bevel 1851 and a second insertion bevel 1852 are rigidly attached to the setting channel 1800. The first insertion bevel 1851 is angled with respect to the transport direction 1890, and serves to guide the foremost fastening element 1811, as seen in the transport direction 1890, of the upper row of fastening elements 1810 of FIG. 23 toward the setting channel 1800, as the receptacle 1841 of the foremost fastening element 1811 contacts the first insertion bevel 1851 linearly—and in particular slides tangentially over the first insertion bevel 1851. The linear contact 1829 is oriented parallel to the fastening direction.

FIG. 24 is a partial plan view of a setting channel 1900 and a fastening element strip 1905 with fastening elements 1910. The fastening elements 1910 are transported in a magazine, which is not shown, into the setting channel 1900 in a transport direction 1990. The fastening elements 1910 are designed as nails and define a fastening direction 1980 extending into the drawing plane, such that only the heads of the fastening elements 1910 can be seen in FIG. 24. The fastening elements 1910 are arranged in two rows, which are arranged one behind the other in a transverse direction 1970 oriented perpendicular to the transport direction 1990 and perpendicular to the fastening direction 1980.

A first insertion bevel 1951 and a second insertion bevel 1952 are rigidly attached to the setting channel 1900. The first insertion bevel 1951 is angled with respect to the transport direction 1990, and serves to guide the foremost fastening element 1911, as seen in the transport direction 1990, of the upper row of fastening elements 1910 of FIG. 24 toward the setting channel 1900, as the receptacle 1941 of the foremost fastening element 1911 contacts the first insertion bevel 1951 over a flat surface—and in particular slides over the first insertion bevel 1951. The flat surface contact 1929 in this case is particularly planar and oriented parallel to the fastening direction 1980.

FIG. 25 is a partial sectional view of an insertion bevel 2051 and a fastening element strip 2005 with fastening elements 2010. The fastening elements 2010 define a fastening direction 2080 and are received and held in receptacles 2009 of the fastening element strip 2005. The insertion bevel 2051 serves to guide the fastening element strip 2005 because the receptacle 2041 of a foremost fastening element 2011 contacts the insertion bevel 2051 on a flat surface and slides over the first insertion bevel 2051. The flat surface contact 2029 in this case is particularly planar and oriented parallel to the fastening direction 2080. In addition, the contact 2029 extends over the entire length of the receptacle 2041 in the fastening direction 2080.

FIG. 26 is a partial sectional view of an insertion bevel 2151 and a fastening element strip 2105 with fastening elements 2110. The fastening elements 2110 define a fastening direction 2180 and are received and held in receptacles 2109 of the fastening element strip 2105. The insertion bevel 2151 serves to guide the fastening element strip 2105 because the receptacle 2141 of a foremost fastening element 2111 contacts the insertion bevel 2151 on a flat surface and slides over the first insertion bevel 2151. The flat surface contact 2129 in this case is particularly planar and oriented parallel to the fastening direction 2180. In addition, the insertion bevel 2151, and thus the contact 2129 along the fastening direction 2080, are interrupted.

FIG. 27 is a partial plan view of a setting channel 2200 and a magazine 2240 with a fastening element strip 2205, with fastening elements 2210, arranged therein. The fastening elements 2210 are transported in the magazine 2240 into the setting channel 2200 in a transport direction 2290. The fastening elements 2210 are designed as nails and define a fastening direction 2280 extending into the drawing plane, such that only the heads of the fastening elements 2210 can be seen in FIG. 27. The fastening elements 2210 are arranged in two rows, which are arranged one behind the other in a transverse direction 2270 oriented perpendicular to the transport direction 2290 and perpendicular to the fastening direction 2280. A first insertion bevel 2251 and a second insertion bevel 2252 are rigidly attached to the setting channel 2200. The first insertion bevel 2251 is angled with respect to the transport direction 2290, and serves to guide the foremost fastening element 2211, as seen in the transport direction 2290, of the upper row of fastening elements 2210 of FIG. 27 toward the setting channel 2200.

The foremost fastening element 2211, as seen in the transport direction 2290, of the upper row in FIG. 27 also contacts a guide channel 2220 of the magazine 2240 at one point 2261, whereas the foremost fastening element 2212, as seen in the transport direction 2290, of the lower row in FIG. 27 contacts the guide channel 2220 at a second contact point 2262. Since, in the situation shown in FIG. 27, only one fastening element of each row of fastening elements is present in the magazine 2240, a distance A between the contact points 2261, 2262 measured in the transport direction 2290 is relatively small. As a result, a force 2265 which is exerted for example by a feed element (not shown) of the magazine 2240 on the fastening element strip 2205 produces a relatively large torque 2263 on the remaining fastening elements 2210, which may lead to jamming of the fastening element strip 2205 under certain circumstances.

FIGS. 28 and 29 show a setting channel 2300 and a magazine 2340 with a fastening element strip 2305 arranged therein in a plan view—and in FIG. 30 in a sectional view. The fastening element strip 2305 comprises two rows 2306, 2307 of receptacles 2309 which are oriented in a transport direction 2390, as well as fastening elements 2310 which are received in the receptacles 2309 and which define a fastening direction 2380. The rows 2306, 2307 of receptacles 2309 are arranged one behind the other in a transverse direction 2370 oriented perpendicular to the transport direction 2390 and perpendicular to the fastening direction 2380. A first insertion bevel 2351 and a second insertion bevel 2352 are rigidly attached to the setting channel 2300. The first insertion bevel 2351 is angled with respect to the transport direction 2390, and serves to guide the foremost fastening element 2311, as seen in the transport direction 2390, of the upper row of fastening elements 2310 of FIG. 29, toward the setting channel 2300.

The fastening element strip 2305 has support projections 2371, each having a contact surface 2372 for the fastening element strip 2305 to contact a guide channel 2320 of the magazine 2340. The support projections 2371 each protrude from a receptacle 2309 of a row 2306, 2307 and are offset in the transport direction 2390 in relation to the fastening element 2310 received in the receptacle 2309. Due to the offset in the transport direction 2390, the support projections 2371 support the fastening element strip 2305 in the guide channel to prevent tilting about a tilting axis pointing in the fastening direction 2380, and thus counteract a corresponding torque.

The foremost fastening element 2311, as seen in the transport direction 2390, of the upper row in FIG. 29 is supported on the guide channel 2320 of the magazine 2340 at a point 2361, whereas the foremost fastening element 2312, as seen in the transport direction 2390, of the lower row in FIG. 29 is supported on the guide channel 2320 at a second contact point 2362. Although only one fastening element of each row of fastening elements is present in the magazine 2340 in the situation shown in FIG. 29, a distance A' between the contact points 2361, 2362 measured in the transport direction 2390 is greater—and in particular, is substantially greater—than an offset between the fastening elements 2311, 2312 in the transport direction 2390. As a result, a force 2365 which is exerted for example by a feed element (not shown) of the magazine 2340 on the fastening element strip 2305 produces a relatively small torque 2363 on the remaining fastening elements 2310, thereby reducing the risk of the fastening element strip 2305 jamming. As shown in FIG. 29, the foremost support projection 2381 of the upper row of fastening elements 2310 and the first insertion bevel 2351 are arranged one behind the other in the fastening direction 2380, and preferably intersect in a projection in the fastening direction 2380.

FIG. 31 shows a plan view of a fastening element strip 2405. The fastening element strip 2405 comprises two rows 2406, 2407 of receptacles 2409 oriented in a transport direction 2490, as well as fastening elements, not shown, which are received in the receptacles 2409 and which define a fastening direction 2480 extending into the plane of the drawing. The rows 2406, 2407 of receptacles 2409 are arranged one behind the other in a transverse direction 2470 oriented perpendicular to the transport direction 2490 and perpendicular to the fastening direction 2480.

The fastening element strip 2405 has support projections 2471, each with a contact surface 2472 for the fastening element strip 2405 to contact a guide channel, which is not shown, of a magazine of a driving apparatus. The support projections 2471 each protrude from a receptacle 2409 of a row 2406, 2407 and are offset in the transport direction 2490 in relation to the fastening element 2410 received in the receptacle 2409. Due to the offset in the transport direction 2490, the support projections 2471 support the fastening element strip 2405 in the guide channel to prevent tilting about a tilting axis pointing in the fastening direction 2480.

The invention has been described with reference to a number of embodiments. The individual features of the various embodiments can be used individually or in any combination with each other, unless they contradict each other. It should be noted that the apparatus according to the invention and the fastening element strip according to the invention can also be used for other applications.

The invention claimed is:

1. A fastening element strip, having a plurality of rows of receptacles for fastening elements, oriented in a transport direction, and fastening elements which are received in the receptacles and which define a fastening direction, wherein the rows of receptacles are arranged one behind the other in a transverse direction which is perpendicular to the transport direction and perpendicular to the fastening direction, and having a connecting web which connects a receptacle of a first row of the plurality of rows to a receptacle of a second row of the plurality of rows.

2. The fastening element strip according to claim 1, wherein each receptacle is offset in the transport direction relative to all other receptacles of the plurality of rows of receptacles.

3. The fastening element strip according to claim 2, wherein the offset measured in the transport direction between two receptacles which are adjacent in the transport direction is substantially the same for all receptacles.

4. The fastening element strip according to claim 1, wherein each receptacle of the first row is directly connected to an adjacent receptacle of a second row via a connecting web.

5. The fastening element strip according to claim 1, wherein the connecting web has a predetermined breaking point for separating at least one of the receptacles in an apparatus for driving fastening elements into a substrate, the apparatus comprising a setting channel; an energy transmitting element which can move in the setting channel in a fastening direction to transmit energy to each of the fastening elements; and a magazine for transporting the fastening elements to the setting channel in a transport direction, wherein the magazine is suitable for transporting, at the same time, a plurality of rows of fastening elements arranged one behind the other in a transverse direction oriented perpendicular to the transport direction and perpendicular to the fastening direction, to alternately transport fastening elements of different rows of the plurality of fastening element rows into the setting channel.

6. The fastening element strip according to claim 1, wherein the fastening element strip has a support projection with a contact surface for the fastening element strip to contact a guide channel of a magazine of an apparatus for driving fastening elements into a substrate, the apparatus comprising a setting channel; an energy transmitting element which can move in the setting channel in a fastening direction to transmit energy to each of the fastening elements; and a magazine for transporting the fastening elements to the setting channel in a transport direction, wherein the magazine is suitable for transporting, at the same time, a plurality of rows of fastening elements arranged one behind the other in a transverse direction oriented perpendicular to the transport direction and perpendicular to the fastening direction, to alternately transport fastening elements of different rows of the plurality of fastening element rows into the setting channel, wherein the support projection protrudes from a receptacle of an outermost row of the plurality of rows and is offset in the transport direction from a fastening element received in the receptacle.

\* \* \* \* \*